April 30, 1940.  O. E. FISHBURN  2,198,662
TRANSMISSION
Filed April 2, 1938   2 Sheets-Sheet 1
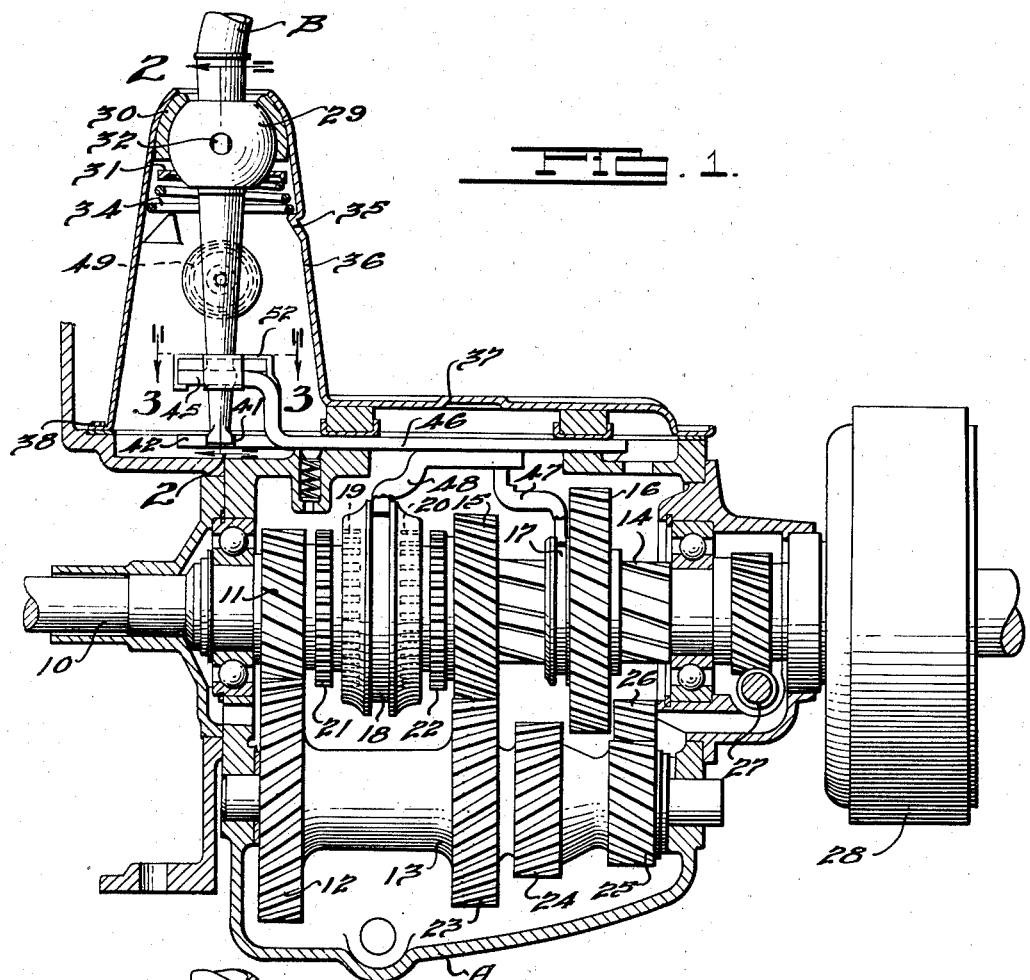
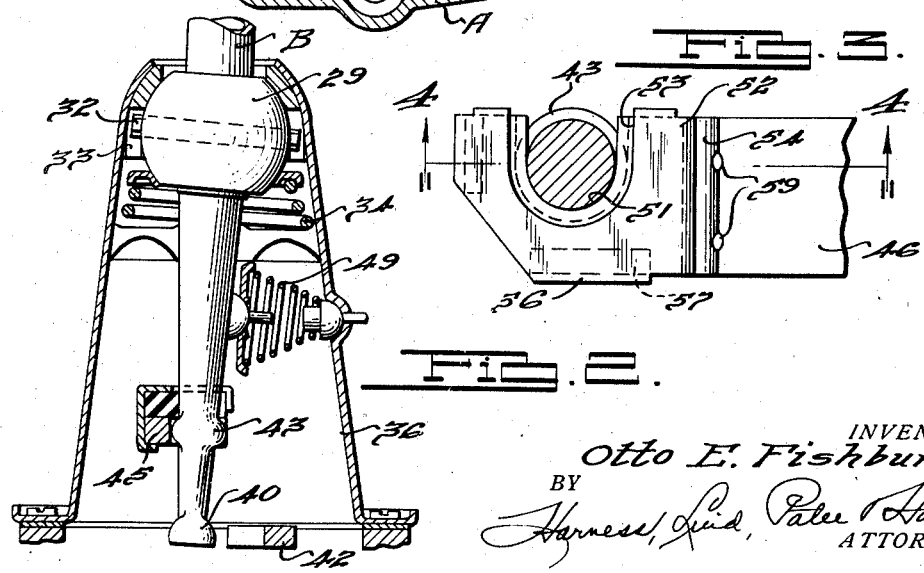
INVENTOR
Otto E. Fishburn.
BY
ATTORNEYS.

April 30, 1940.  O. E. FISHBURN  2,198,662
TRANSMISSION
Filed April 2, 1938   2 Sheets-Sheet 2
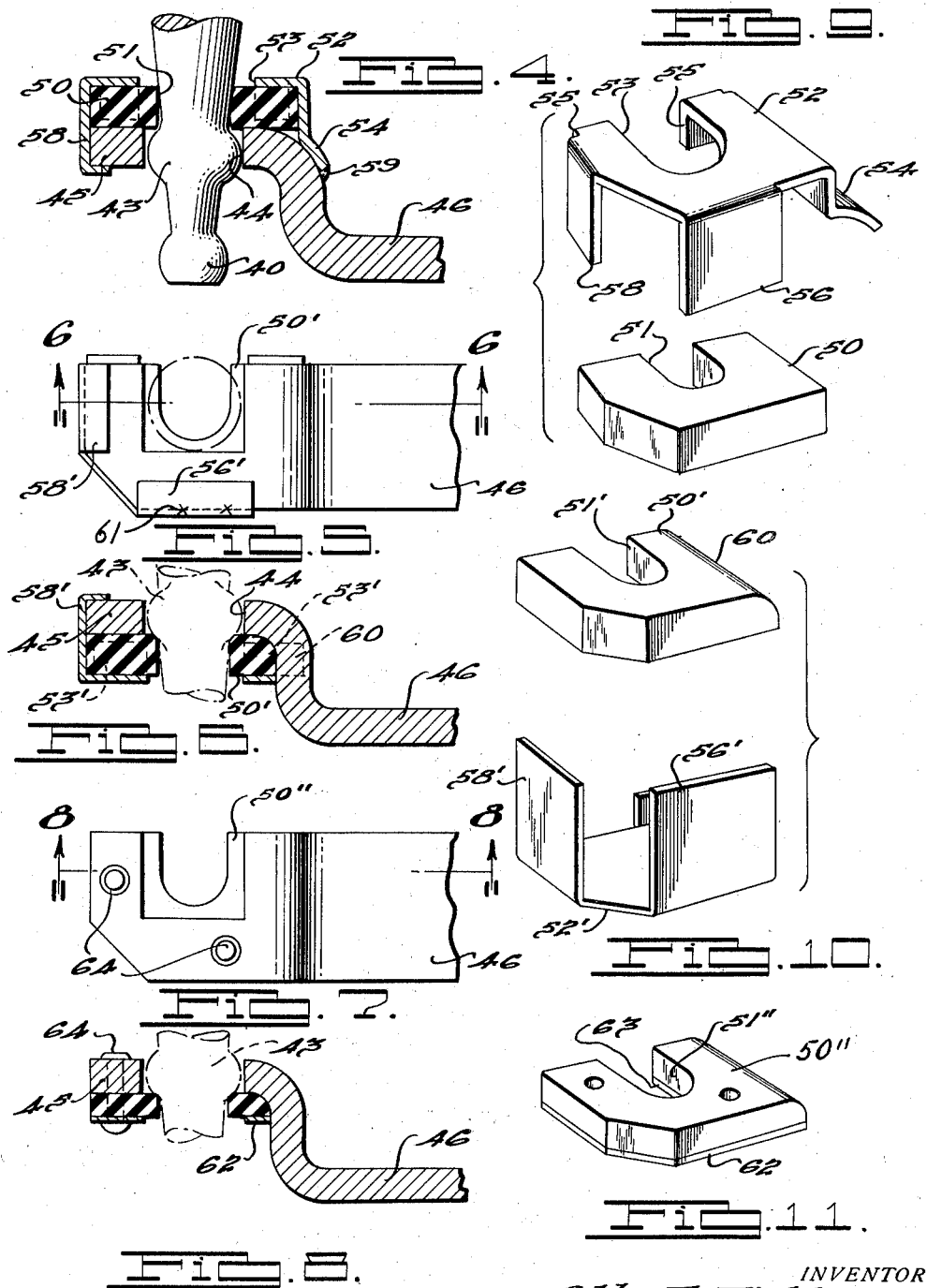
INVENTOR
Otto E. Fishburn.
BY
Harness, Dietz, Patee & Harris
ATTORNEYS.

Patented Apr. 30, 1940

2,198,662

UNITED STATES PATENT OFFICE 2,198,662

TRANSMISSION

Otto E. Fishburn, Detroit, Mich., assignor to Chrysler Corporation, Highland Park, Mich., a corporation of Delaware Application April 2, 1938, Serial No. 199,611

19 Claims. (Cl. 74—473)

This invention relates to gear shifting mechanisms of the type used in motor vehicle power transmissions for controlling the speed ratio between the driving and driven shafts.

One of the objects of the invention is the provision of improved means for dampening and eliminating objectionable noises resulting from vibrations in the transmission shifting mechanism induced by road shocks and by operation of the vehicle power plant.

More particularly my invention is especially applicable to transmissions of the well known type having a gear shift lever movable laterally and longitudinally with the well known H-type of movement; for example, in selectively moving the transmission shift rails to effect changes in the gear trains of the transmission. While it will be understood that the broader aspects of my invention are not limited in its application to the aforesaid well known arrangement of shiftable gear transmission, such arrangement is preferred in explaining the principles of my invention and is accordingly illustrated in my accompanying drawings.

In the foregoing type of transmission, I have provided improved means preferably of a yieldable nature which maintains the shift lever out of engagement with the shifter rail during operation of the transmission, that is, for instance, when the lever is moved into a notch in one of the rails and is retained therein during operation of the transmission in transmitting driving torque from the driving shaft to the driven shaft. Shocks due to road irregularities and to power plant vibrations cause the shift lever to set up objectionable noises, such as buzzing in the shift rails, and the yielding means aforesaid serves to dampen and eliminate these noises.

Another object of the invention is the provision of insulating and dampening means of this character which yieldably engages the shifter lever and which is so constructed and arranged with respect to the lever and rails that the force necessary for manipulation of the latter by the lever is not directed against the yielding means, thus eliminating scuffing and undue wear of the latter while effectively dampening the objectionable noises set up in the shifting mechanism by vibratory forces aforesaid.

A still further object of the invention is to provide relatively simple and inexpensive means for accomplishing these objects.

Further objects and advantages of the invention will be more apparent from the following description of the invention, taken in connection with the drawings, in which:

Fig. 1 is a sectional side elevational view through the transmission and shift mechanism therefor.

Fig. 2 is an enlarged second view view along the line 2—2 of Fig. 1 showing the operating end portion of the shift lever.

Fig. 3 is a top plan view taken as indicated by the line 3—3 of Fig. 1.

Fig. 4 is a sectional side elevational view taken as indicated by the line 4—4 of Fig. 3.

Fig. 5 is a view similar to Fig. 3 but indicating a modified form of the invention.

Fig. 6 is a sectional side elevational view taken as indicated by the line 6—6 of Fig. 5.

Fig. 7 is a view similar to Figs. 3 and 5 but indicating a further modification of the invention.

Fig. 8 is a sectional side elevational view taken as indicated by the line 8—8 of Fig. 7.

Fig. 9 is an exploded view in perspective of the insulating and dampening means and retainer therefor, shown in Figs. 3 and 4.

Fig. 10 is a view similar to Fig. 9 but illustrating the insulating and dampening means and retainer therefor, shown in Figs. 5 and 6.

Fig. 11 is a perspective view of the insulating and dampening means shown in Figs. 7 and 8.

In the drawings, reference character A represents the transmission of any suitable type selectively operated by gear shift lever B.

Transmission A includes the usual driving shaft 10, having a gear 11 meshing with gear 12 on countershaft 13. The driven shaft 14 has a fixed gear 15, a slidable gear 16 splined thereon and provided with a shift collar 17, and the slidable splined clutch member 18 having the usual internal teeth 19 and 20 adapted to selectively clutch with teeth 21 and 22 carried by gears 11 and 15 respectively. Meshing with gear 15 is a countershaft gear 23, the countershaft being further provided with gears 24 and 25.

First speed or low gear is obtained by sliding gear 16 into mesh with gear 24; second speed is effected by shifting clutch 18 to engage teeth 20 and 22; and direct or high is obtained by shifting clutch 18 to engage teeth 19 and 21. Reverse is effected by shifting gear 16 into mesh with a reverse gear 26, the latter being in constant mesh with gear 25. The driven shaft 14 may have the usual speedometer drive 27 and propeller shaft brake generally indicated at 28, it being understood that the drive passes rearwardly of the transmission to drive the rear wheels (not shown) of the motor vehicle for a rear wheel drive type of automobile.

For controlling the selective movements of clutch 18 and collar 17 of gear 16, the shift lever B has an intermediate ball portion 29 supported between upper and lower socket portions 30 and 31, a pin 32 extending through ball 29 and having its ends projecting therefrom for guided movement in the vertical slots 33 of socket portion 30. The ball 29 and lever B is thus capable of longitudinal or forward and rearward movements pivoting about pin 32, and lateral movements within the socket portions 30 and 31, the pin ends 32 sliding in slots 33. Preferably, the socket portion 31 is yieldingly urged upwardly by a spring 34 seated by an annular series of abutments 35 pressed inwardly from the sheet metal stack 36 which receives the lower end of lever B and supports ball 29, the stack 36 having a transmission cover portion 37 and being suitably removably secured at 38 to the casing of transmission A.

Beneath the pivot at ball 29 the lever B has an operating end portion terminating in a rounded end 40 adapted for movement into a notch 41 of a shifter rail 42. The lever B has another rounded portion 43 adapted for movement into a notch 44 of the raised portion 45 of a shifter rail 46. The rail 42 is the shifter for effecting operation of first and second speed ratios and is provided with a finger 47 engaging the collar 17, while rail 46 is the shifter for the second and high speed ratios and is provided with a finger 48 for operating the clutch 18.

A spring 49 yieldably urges the lower end of the lever laterally, preferably into the notch 44 of rail 46 when in neutral, and also exerts a longitudinal component of thrust on the lower end portion of the lever when the latter is thrust longitudinally in selectively moving the rails, as is more particularly pointed out in Neracher U. S. Patent No. 2,077,578.

The invention is directed more particularly to insulating the shift lever and rails and in the illustrated embodiment thereof the insulating and dampening means is shown in connection with the shifter rail 46 for the second and third speed ratios, inasmuch as it is well known that the transmission operates in the third speed ratio during the major portion of the time the vehicle is operated. It will be understood, of course, that the shifter lever and rail 42 may be similarly insulated, if desired.

The insulating and dampening means preferably comprises a yieldable material such as rubber, or synthetic rubber having the characteristics of natural rubber, but which will not deteriorate in the presence of oils or lubricants. In the form of the invention illustrated in Figs. 1, 2, 3, 4 and 9, a preformed block of yieldable material 50 rests upon the top surface of the rail and is provided with a notch 51 adapted to register with the notch 44 of the rail 46. As illustrated more particularly in Figs. 3 and 4, the material of the block 50 extends inwardly beyond the walls defining the notch 44 in the rail to engage the periphery of the lever B immediately above the rounded portion 43 thereof when the lever is positioned in the notch 44. The rounded portion 43 of the lever is retained in spaced relation with respect to the walls defining the notch 44 by the block 40. When the lever is moved to effect longitudinal movement of the rail 46 to selectively operate the second or third speed ratio, the rounded portion 43 of the lever engages the wall of the notch and the forces for effecting the aforesaid movement of the rail are not directed against nor taken through the block 50 although it will be understood that the latter will be yieldably deformed to some extent due to the movement of the lever. When, however, the longitudinal shift of the rail has been completed, the rounded portion 43 of the lever will be positioned as shown in Fig. 4 with respect to the wall of the notch 44, the block 50 retaining the lever out of engagement with the rail and thus eliminating metal to metal contact between these parts and the resultant noises due to vibration of the lever.

In this form of the invention the block 50 is maintained in position by a retainer 52 having a notch 53 therein registering with the notches 44 and 51 aforesaid, the walls of the notch 53 having sufficient clearance with the adjacent portion of the lever to accommodate movement of the latter for shifting the rail 46. The retainer 52 may comprise a stamping and has a substantially flat horizontally disposed face portion and a plurality of depending flanges, including a side flange 54, the lower end portion of which has a curvature conforming to the curvature of the adjacent portion of the rail and engaging the latter. Flanges 55 are disposed on either side of the notch and prevent displacement of the block in a direction laterally of the rail while an oppositely disposed flange 56 has its free end portion bent at right angles to engage the underneath surface of the rail, as is shown at 57 in Fig. 3. A flange 58 is disposed opposite the flange 54 and cooperates with the latter to prevent displacement of the block longitudinally with respect to the rail. The end portion of the flange 58 is bent at right angles to engage the undersurface of the rail, as indicated in Fig. 4.

In assembly, the block 50 and the retainer 52, as shown in Fig. 9, are assembled by inserting the former within the latter so that the notches thereof are in registered relation. The flanges 56 and 58 are deformed to the positions shown in Figs. 3 and 4 and the assembly slipped onto the rail. This method of assembly is permitted by reason of the fact that the flanges 55 are relatively short and do not depend sufficiently to interfere with the rail in slipping the assembly onto the latter. If desired, however, the flanges 56 and 58 may be deformed after the block and retainer have been positioned with respect to the rail. The flange 54 is preferably arc-welded to the rail as indicated at 59, the arrangement of parts facilitating this operation without injurious effects to the material of the block.

Positioning the block 50 at the upper surface of the rail 46 permits the use of a substantial body of the material at opposite sides of the notch, fore and aft of the rail, and further provides a sufficient area of material for retention purposes.

In the form of the invention illustrated in Figs. 5, 6 and 10, the block of yieldable material 50' is generally similar to that illustrated in Fig. 9 and is positioned at the lower surface of the rail 46 with the notch 51' registering with the notch 44 of the rail. An edge portion 60 of the block 50' conforms to the curvature of the adjacent portion of the rails, as is shown in Fig. 6. The walls of the notch 51' extend inwardly beyond the walls defining the notch 44 of the rail to engage the periphery of the shift lever B immediately below the rounded portion 43 thereof. In this form of the invention, the rounded portion 43 of the lever B also engages the walls of the notch 44 of the rail in effecting longitudinal movement of the latter, the material of the block 50' yieldably accommodating movement of the lever for effecting longitudinal movement of the rail. The wall portions of the notch 51' retain the rounded portion 43 of the lever out of contact with the wall of the rail during operation of the transmission, thus eliminating metal to metal contact between these parts and the resultant noises which would otherwise be set up in the shifting mechanism by road shocks and operation of the vehicle motor.

The block 50' is maintained in assembled position by retainer 52', generally similar to the retainer 52, and having a plurality of side flanges as illustrated more particularly in Fig. 10. A side flange 58' is deformed inwardly into overlapping engagement with the adjacent edge portion of the rail, as shown in Figs. 5 and 6, and a second flange 56' is deformed into overlapping engagement with the adjacent portion of the rail. A pair of relatively short flanges 53' engage the outer face of the block 51' to prevent displacement of the latter laterally with respect to the rail, one of the flanges 53' extending longitudinally of the rail to overlap the adjacent portion thereof as indicated at 60.

In this form of the invention the block 50' is inserted in the retainer 52' and the assembly is then positioned with respect to the rail as shown in Figs. 5 and 6. The flanges 56' and 58' are then preferably deformed into engagement with the rail, as shown in Figs. 5 and 6, although it will be understood that, if desired, the flange 56' or 58' may be deformed to the position shown in Figs. 5 and 6 and the assembly slipped on the rail. The other of the latter flanges is then deformed to a position for final assembly. The retainer 52' is preferably securely fixed in assembled position by spot-welding the same to the rail, as indicated at 61.

In the form of the invention illustrated in Figs. 7, 8 and 11, the block of yieldable material 50" is vulcanized or otherwise suitably bonded to a plate 62 and this assembly positioned with respect to the raised portion of the rail 46 with the upper face of the block engaging the lower surface of the rail. The plate 62 has a notch 63 therein disposed in registering relation with the notch 51" and the notch 44 of the rail. The walls of the block 50" defining the notch therein extend inwardly beyond the walls defining the notches in the rail and plate to engage the periphery of the lever B immediately below the rounded end portion 43 thereof for the purposes set forth in connection with the forms of the invention previously described. The plate 62 and block 50" are retained in fixed position with respect to the rail by rivets 64 disposed in aligned openings in the plate, block and rail.

The blocks 50, 50' and 50" preferably comprise a yieldable material which will not deteriorate in the presence of oil or other lubricants. These blocks also preferably comprise a material having sound deadening properties. As an illustrative embodiment, these members may comprise neoprene, formerly called "duprene" and chemically known as polymerized chloroprene, the product being manufactured and sold under the above trade names. While this product has rubber-like physical characteristics, its oil and heat-resisting properties are far superior to the corresponding properties of natural rubber, for instance, from which the aforesaid members may be formed if desired.

The following is an illustrative "neoprene" composition which is suitable for the manufacture of the foregoing parts:

| | Parts by weight |
|---|---|
| Neoprene | 100 |
| Magnesium oxide | 10 |
| Zinc oxide | 10 |
| Wood resin | 5 |
| Antioxidant | 1 |
| Sulphur | 1 |
| Carbon black | 20 |
| Brown factice | 30 |

It has been determined that a vehicle motor which is mounted by means of rubber supports, as is well known in the motor-mounting art, produces definite vibratory forces some of which tend to vibrate the shift lever in a direction generally longitudinally of the vehicle while other of these forces tend to vibrate the lever laterally. In the illustrative embodiments of the invention, the insulating means including the blocks 50, 50' and 50" serve to minimize and dampen these vibrations of the lever and thereby eliminate the noises resulting from such action.

In the operation of the illustrative embodiment of the invention when the vehicle is at rest, the spring 49 urges the lever B laterally into the notch 44 of rail 46 and the block of yieldable material, as shown in the various embodiments thereof, engages the peripheral surface of the lever adjacent the rounded portion 43 thereof for maintaining the latter out of contact with the walls of the notch 44. Vibration of the lever due to shocks induced by operation of the vehicle motor does not produce the various noises which would otherwise result should the rounded portion of the lever be permitted to intermittently or constantly contact the walls of the notch in the rail. It is well known that the transmission mechanism operates through the third speed ratio during the major portion of the time the vehicle is operated, and when the transmission is so operated the lever B is maintained out of contact with the walls of the notch 44 and the rail 46, as is the case when the vehicle is at rest. Thus the lever and rail are so insulated as to eliminate and dampen noises resulting from vibrations in the shifting mechanism, including the lever and rails, during substantially the entire period of vehicle operation.

Although several specific embodiments of the invention are herein shown and described, it will be understood that various changes in the size, shape and arrangement of parts may be made without departing from the spirit of my invention.

What I claim is:

1. In a transmission mechanism including a plurality of selectively operable speed ratio devices, means for selectively controlling the speed ratio devices including a shifter rail having a notch therein, a shift lever having a portion thereof adapted to be received in said notch and engage the wall of the latter for actuating said rail, and means for insulating said lever with respect to said rail, said means including a yieldable member comprising a rubber-like composition disposed adjacent to and in registering relationship with said notch and adapted to engage said lever in spaced relation to said portion thereof engageable with said rail for actuating the latter.

2. In a transmission mechanism including a plurality of selectively operable speed ratio devices, means for selectively controlling the speed ratio devices including a shifter rail having a notch therein, a shift lever having a portion thereof adapted to be received in said notch and engage the wall of the latter for actuating said rail, means for insulating said lever with respect to said rail, said means including a yieldable member comprising a rubber-like composition adapted to engage said lever in spaced relation to said portion thereof engageable with said rail for actuating the latter, and means for securing said member to said rail.

3. In a transmission mechanism including a plurality of selectively operable speed ratio devices, means for selectively controlling the speed ratio devices including a shifter rail having a notch therein, a shift lever having a portion thereof adapted to be received in said notch and engage the wall of the latter for actuating said rail, means for insulating said lever with respect to said rail, said means including a yieldable member comprising a rubber-like composition adapted to engage said lever in spaced relation to said portion thereof engageable with said rail for actuating the latter, and means for securing said member to said rail, said securing means and said member each having a notch therein registering with the notch in said rail, the notch in said securing means and said rail each having a dimension greater in one direction than the dimension of the notch in said member in the corresponding direction.

4. In a transmission mechanism including a plurality of selectively operable speed ratio devices, means for selectively controlling the speed ratio devices including a shifter rail having a notch therein, a shift lever having a portion thereof adapted to be received in said notch and engage the wall of the latter for actuating said rail, means for insulating said lever with respect to said rail, said means including a yieldable member comprising a rubber-like composition adapted to engage said lever in spaced relation to said portion thereof engageable with said rail for actuating the latter, and means for securing said member to said rail, said securing means including a metallic plate-like element bonded to said member.

5. In a transmission mechanism including a plurality of selectively operable speed ratio devices, means for selectively controlling the speed ratio devices including a shifter rail having a notch therein, a shift lever having a portion thereof adapted to be received in said notch and engage the wall of the later for actuating said rail, means for insulating said lever with respect to said rail, said means including a yieldable member comprising a rubber-like composition adapted to engage said lever in spaced relation to said portion thereof engageable with said rail for actuating the latter, and means for securing said member to said rail, said securing means including a retainer having a portion thereof overlapping said member and having a flange engaging said rail.

6. In a transmission mechanism including a plurality of selectively operable speed ratio devices, means for selectively controlling the speed ratio devices including a shifter rail having a notch therein, a shift lever having a portion thereof adapted to be received in said notch and engage the wall of the latter for actuating said rail, and means including a yieldable non-metallic member carried by said rail and adapted to engage said lever in spaced relation to said portion thereof engageable with said rail for actuating the latter, said member retaining the first mentioned portion of said lever in spaced relation to the wall of said notch when said lever is at rest therein.

7. In a transmission mechanism including a plurality of selectively operable speed ratio devices, means including a shiftable member for selectively controlling the speed ratio devices, means for actuating said shiftable member including an actuating member having a portion thereof adapted to engage said shiftable member for actuating the latter, and non-metallic means supported by said shiftable member and engageable with another portion of said actuating member for yieldably retaining the first mentioned portion of the latter in spaced relation to said shiftable member.

8. In a transmission mechanism including a plurality of selectively operable speed ratio devices, means including a shiftable member for selectively controlling the speed ratio devices, means for actuating said shiftable member including an actuating member having a portion thereof adapted to engage said shiftable member for actuating the latter, and non-metallic means supported by said shiftable member and engageable with another portion of said actuating member for yieldably retaining the first mentioned portion of the latter in spaced relation to said shiftable member, said means including an abutment comprising a rubber-like composition characterized by sound insulating and lubricant-resisting properties.

9. In a variable speed ratio transmission of the manual selection type, a pair of longitudinally shiftable rails adapted to selectively control the speed ratios, each of said rails having a notch therein, a manually operable lever, means for pivotally mounting said lever with an operating end portion thereof positioned for selective engagement in said notches whereby said rails may be moved longitudinally relative to each other, means yieldably thrusting said lever laterally into one of said notches, non-metallic means for yieldably retaining said lever in spaced relation to the walls of said last mentioned notch, said non-metallic means yieldably accommodating movement of said lever whereby the latter directly engages the wall of said last mentioned notch for effecting longitudinal movement of the associated rail.

10. In a transmission mechanism including a plurality of selectively operable speed ratio devices, means for selectively controlling the speed ratio devices including a shifter rail having a notch therein, a shift lever having a portion thereof adapted to be received in said notch and engage the wall of the latter for actuating said rail, and means for insulating said lever with respect to said rail, said means including a yieldable member comprising a rubber-like composition adapted to engage said lever in spaced relation to said portion thereof engageable with said rail for actuating the latter, said member having a notch therein registering with the notch in said rail, the wall defining the notch in said member extending inwardly with respect to the notch in said rail beyond the wall defining the latter notch.

11. In a variable speed ratio transmission of the selectively operable type, means including a pair of rails adapted to selectively control the speed ratios, a pivotally mounted lever for moving said rails longitudinally of each other, one of said rails having a notched portion off-set vertically with respect to the adjacent portion of the other of said rails and adapted to receive said lever, said lever having a thrust portion engageable with said notched off-set portion for moving said rail longitudinally, and a yieldable non-metallic member for maintaining the thrust portion of said lever in spaced relation to said notched off-set portion when said lever is at rest in the latter, said member yielding to accommodate engagement of said thrust portion with said notched off-set portion.

12. In a variable speed ratio transmission of the selectively operable type, means including a pair of rails adapted to selectively control the speed ratios, a pivotally mounted lever for moving said rails longitudinally of each other, one of said rails having a notched portion off-set vertically with respect to the adjacent portion of the other of said rails and adapted to receive said lever, said lever having a thrust portion engageable with said notched off-set portion for moving said rail longitudinally, and a yieldable non-metallic member for maintaining the thrust portion of said lever in spaced relation to said notched off-set portion when said lever is at rest in the latter, said member yielding to accommodate engagement of said thrust portion with said notched off-set portion, and means for securing said yieldable member to the vertically off-set portion of said rail.

13. In a variable speed ratio transmission of the selectively operable type, means including a pair of rails adapted to selectively control the speed ratios, a pivotally mounted lever for moving said rails longitudinally of each other, one of said rails having a notched portion off-set vertically with respect to the adjacent portion of the other of said rails and adapted to receive said lever, said lever having a thrust portion engageable with said notched off-set portion for moving said rail longitudinally, and a yieldable non-metallic member secured to the upper surface of the off-set portion of said rail for maintaining the thrust portion of said lever in spaced relation to said notched off-set portion when said lever is at rest in the latter, said member yielding to accommodate engagement of said thrust portion with said notched off-set portion.

14. In a variable speed ratio mechanism of the selectively operable type, means including a shiftable member having a notch therein adapted to selectively control a speed ratio, means including a control member engageable with said shiftable member for actuating the latter, and non-metallic means for yieldably maintaining said control member in spaced relation to said shiftable member when the latter is at rest in said notch, said non-metallic means yielding to accommodate said engagement of said control member with said shiftable member.

15. In a motion transferring mechanism, an operating member having a thrust portion thereof, an operated member adapted for movement by said operating member, yielding means carried by one of said members and engaging the other for yieldingly spacing the thrust portion of said operating member from said operated member, said yielding means accommodating engagement of said thrust portion with said operated member for moving said operated member from said operating member.

16. In a variable speed ratio mechanism of the selectively operable type, means adapted to selectively control a speed ratio including a thrust transmitting member and a member adapted to receive thrust therefrom, and yieldable non-metallic means associated with one of said members normally maintaining said members in spaced relation, said non-metallic means yielding to accommodate engagement of said members.

17. In a motion transferring mechanism, a thrust transmitting member and a member adapted to receive thrust therefrom, and yieldable non-metallic means normally maintaining said members in spaced relation such that said members are free from direct contact with each other in all directions, said means yielding to accommodate thrust transmitting contact between said members in response to force application by the first mentioned member.

18. In a variable speed ratio mechanism of the selectively operable type, means including a shiftable member adapted to selectively control a speed ratio, an operating member movable into engagement with said shiftable member for actuating the latter, and yieldable non-metallic means carried by one of said members and engageable with the other for insulating said members one from the other.

19. In a power transmission mechanism including a plurality of selectively operable speed ratio devices, at least one of said devices including a shiftable member, means for controlling the selective operation of said devices including a member movable to shift said shiftable member, said control means further including another member operable to effect movement of said second mentioned member, and yieldable non-metallic means for normally maintaining at least two of said members in spaced relation, said last named means yielding to accommodate engagement of said last mentioned two members.

OTTO E. FISHBURN.